United States Patent
Dong et al.

(10) Patent No.: US 6,264,003 B1
(45) Date of Patent: Jul. 24, 2001

(54) BEARING SYSTEM INCLUDING LUBRICANT CIRCULATION AND COOLING APPARATUS

(75) Inventors: Qimin Dong, Greenville, SC (US); Jack Young, Columbus, IN (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/409,462

(22) Filed: Sep. 30, 1999

(51) Int. Cl.[7] ............................. F01M 5/00; F16N 17/02
(52) U.S. Cl. .................... 184/104.1; 184/6.22; 384/316; 165/104.19
(58) Field of Search ................... 184/6.22, 104.1; 384/316, 313; 165/104.19

(56) References Cited

U.S. PATENT DOCUMENTS

| | | | |
|---|---|---|---|
| 1,334,844 | * 3/1920 | Day | 184/104.1 |
| 4,200,149 | 4/1980 | Pechner . | |
| 4,418,777 | 12/1983 | Stockton . | |
| 4,445,592 | * 5/1984 | New et al. | 184/6.3 |
| 4,461,340 | 7/1984 | Hart et al. . | |
| 5,220,978 | * 6/1993 | McMaster | 184/104.1 |
| 5,626,470 | * 5/1997 | Gerhardt | 418/84 |
| 5,733,048 | 3/1998 | El-Ibiary et al. . | |
| 5,971,068 | * 10/1999 | Ochiai et al. | 165/290 |

OTHER PUBLICATIONS

W.W. Grainger Catalog No. 389 dated 1998–1999.

* cited by examiner

*Primary Examiner*—David Fenstermacher
(74) *Attorney, Agent, or Firm*—Bernard S. Klosowski, Jr.; Alexander M. Gerasimow; William R. Walbrun

(57) ABSTRACT

A bearing system includes a lubricant circulation apparatus to provide a continuous supply of a cooled lubricant fluid to a bearing device. The bearing device may be a hydrodynamic sleeve bearing having a bearing housing defining a sump for maintaining lubricant fluid therein. The bearing sump is in fluid communication with a reservoir which maintains a supply of lubricant. A pump communicates with the reservoir to draw a desired quantity of lubricant fluid therefrom and deliver it to a heat exchanger. The heat exchanger uses an existing source of air from an operative pump motor to increase the air circulation through the cooling fins of the heat exchanger. The cooled lubricant is thereafter delivered to the bearing inlet and provides a cooler operating environment for the bearing system.

14 Claims, 5 Drawing Sheets

BEARING SYSTEM INCLUDING LUBRICANT CIRCULATION AND COOLING APPARATUS

BACKGROUND OF THE INVENTION

The present invention relates generally to the art of lubricant circulation systems used to provide a continuous supply of lubricant fluid to hydrodynamic sleeve bearings.

Hydrodynamic sleeve bearings are configured so that the shaft rides upon a thin film of lubricant fluid such as a petroleum-based or synthetic oil. In such bearings, the shaft extends through a sleeve material. Further, the bearing typically includes an oil ring to supply the lubricant fluid from a sump defined in the bearing housing to the top of the shaft.

As set forth in U.S. Pat. No. 5,733,048, which is commonly assigned to the applicant and which is incorporated herein by reference, an apparatus and process is provided to supplement the lubrication provided by the oil ring. To accomplish this, a reservoir is provided which is in fluid communication with a bearing outlet such that the lubricant fluid will flow from the sump to the reservoir. The reservoir is configured to maintain therein a predetermined quantity of lubricant fluid. A pump having a pump inlet and a pump outlet provides fluid communication with the reservoir. A pump communicates with the reservoir to draw the lubricant fluid therefrom and deliver it to the bearing inlet. The pump mechanism is regulated such that any excess lubricant flow from the pump is directed back to the reservoir. A filter is used to remove impurities from the lubricant fluid prior to delivery to the bearing housing.

The lubricant circulation apparatus referenced above improves the quality of the lubricant fluid and provides a reliable mechanism for maintaining an appropriate level of oil within the hydrodynamic sleeve bearing sump. However, there remains room for improvement and variation within the art.

SUMMARY OF THE INVENTION

The present invention recognizes and addresses that the foregoing prior art constructions and methods may be varied. Accordingly, it is an object of the present invention to provide an improved lubrication apparatus and process for facilitating the rotation of a mechanical shaft as may be associated with oil film sleeve bearings, hydrodynamic bearings, rolling element bearings, and gear reducers.

It is a further object of the present invention to provide an improved bearing system which continually supplies a cooled lubricant fluid to a bearing device.

It is a more particular object of the present invention to provide a lubricant fluid cooling apparatus and process which uses an existing flow of air to provide cooling of the lubricant.

Some of these objects are achieved by a bearing system for facilitating rotation of a mechanical shaft. The bearing housing defines a sump for maintaining a lubricant fluid therein. A bearing inlet and a bearing outlet are also defined in the housing permitting flow of lubricant fluid through the bearing housing at a predetermined flow rate. A reservoir is in fluid communication with the bearing outlet such that the lubricant fluid will flow from the sump to the reservoir. The reservoir is in further fluid communication with a heat exchanger via a pump. The heat exchanger is operatively disposed within the pathway of a cooling fan associated with a reservoir pump.

Other objects of the invention are achieved by a method of providing a cooled lubricant fluid to a hydrodynamic sleeve bearing. The method involves the steps of draining a defined amount of a lubricant fluid from the sump into a reservoir. Lubricant fluid is then removed by the pump from the reservoir and is passed through a filter for removing contaminants. The filtered lubricant fluid is then introduced into a heat exchanger, such as a fan-assisted radiator cooling apparatus. As the heated lubricant enters the heat exchanger at a first temperature, a flow of cooler air is passed over the heat exchange fins, thereby cooling the lubricant to a lower discharge temperature. The now cooled lubricant is then supplied via the pump pressure to a location radially above a shaft supported by the bearing such that the cooled lubricant fluid is deposited on top of the shaft. The movement of air used with the heat exchanger is supplied by the airflow created by cooling fan of the lubricant circulation pump. The introduction of a cooled lubricant extends the operating life of the lubricated components as well as extends the service interval of the lubricant fluid.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to preferred embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention, which broader aspects are embodied in the exemplary constructions.

As used herein, the terms "cool" or "cooling" are used in a relative sense and in reference to the operative temperature of a fluid lubricant sump supply or reservoir supply as may be employed by oil film sleeve bearings, hydrodynamic bearings, rolling element bearings, or a gear reducer. As such, a fluid stream, even when having a temperature greater than that of the ambient environment, may be referred to as "cool" or "cooling" when the fluid stream is used to remove heat from a fluid lubricant.

Figure 1:
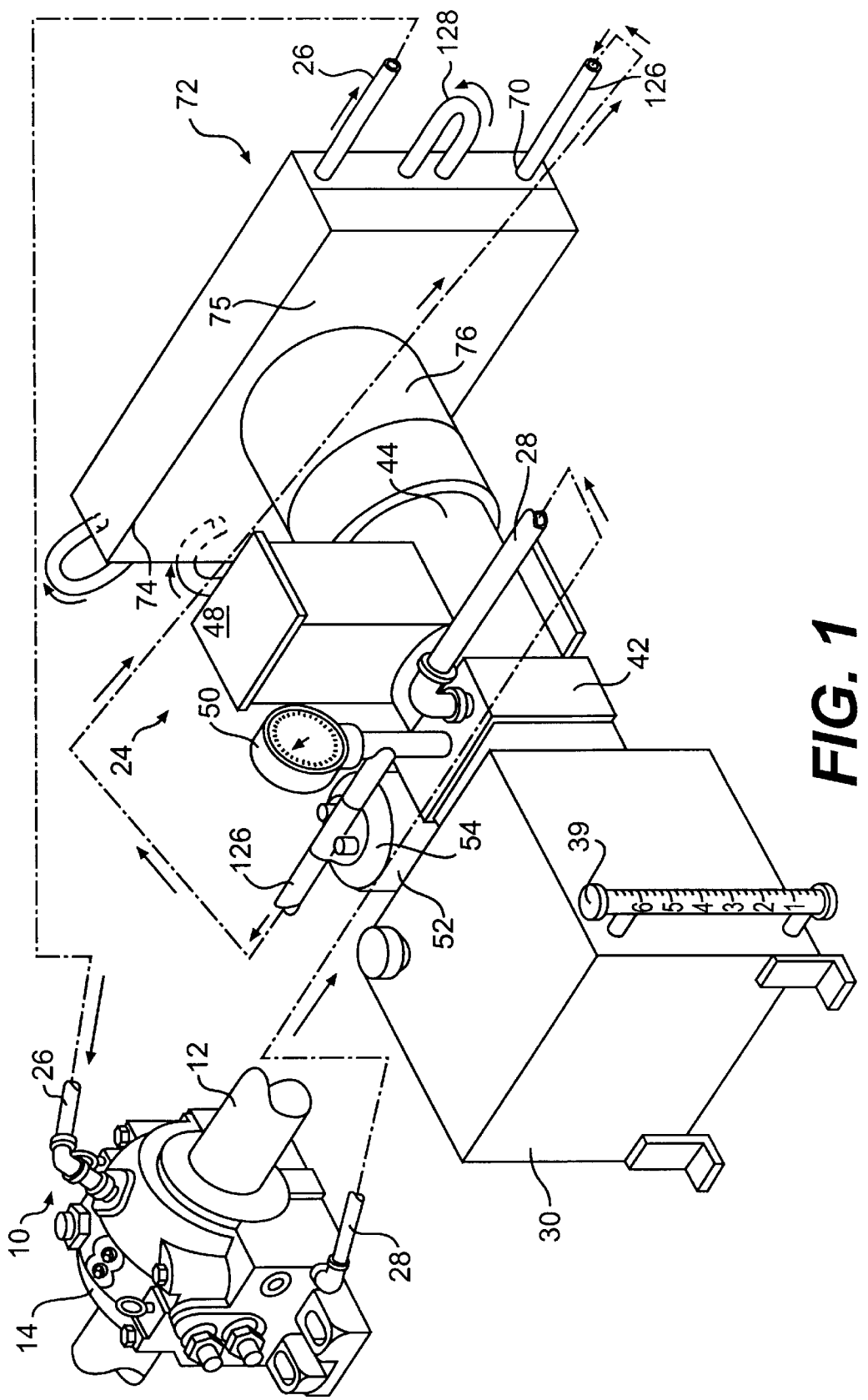
FIG. 1 is a perspective representation of a bearing lubrication system constructed in accordance with the present invention.
Figure 2:
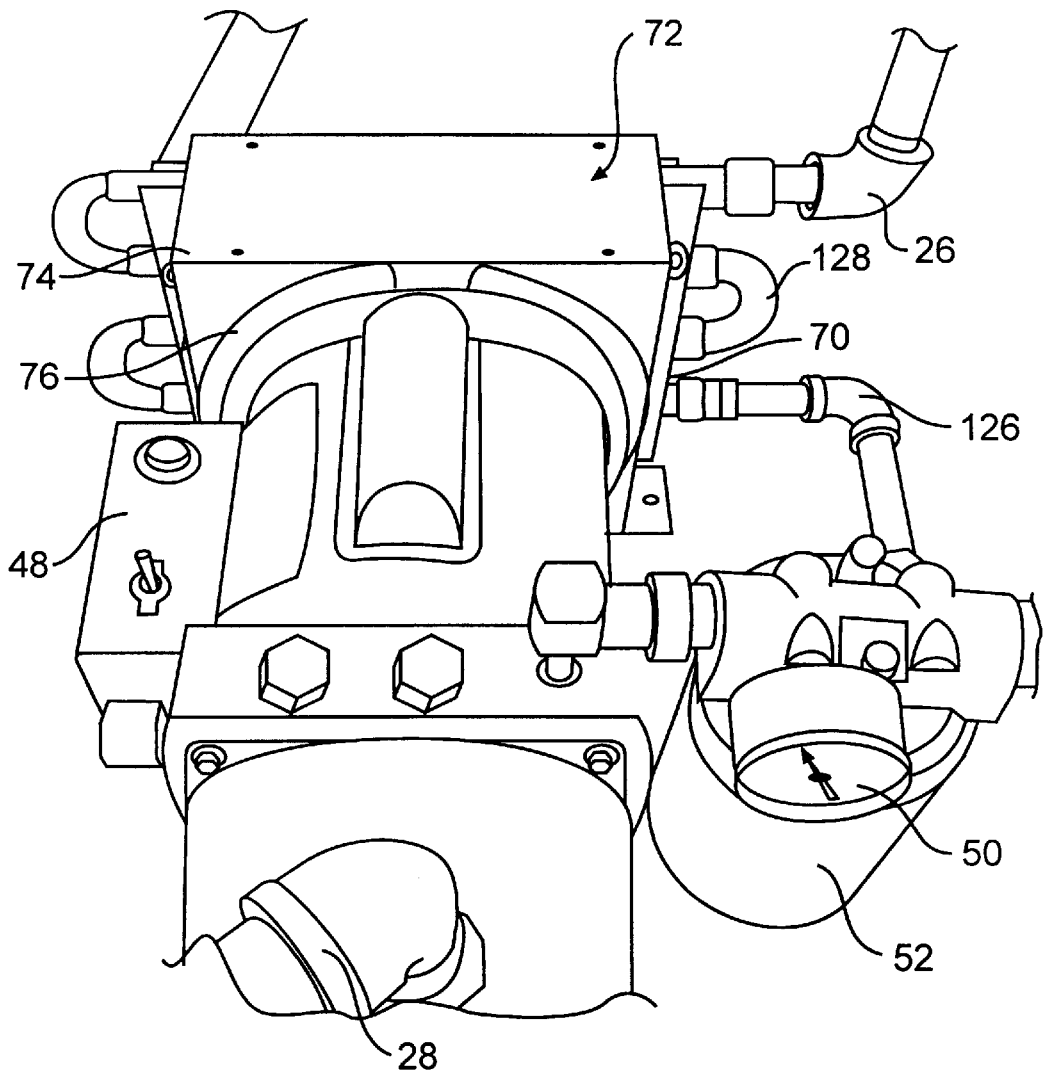
FIG. 2 is a perspective view of the air receiving element associated with the lubricant cooling system as seen in FIG. 1.

FIG. 1 illustrates a hydrodynamic sleeve bearing lubrication system indicated generally at 10 which operatively supports a mechanical shaft 12. Bearing 10 includes a bearing housing 14 defining a sump for maintaining a lubricant fluid such as a petroleum-based or synthetic oil therein. As is well known and as best seen in reference to U.S. Pat. No. 5,733,048 referenced above, shaft 12 extends through a supporting sleeve structure maintained within housing 14.

Figure 4:
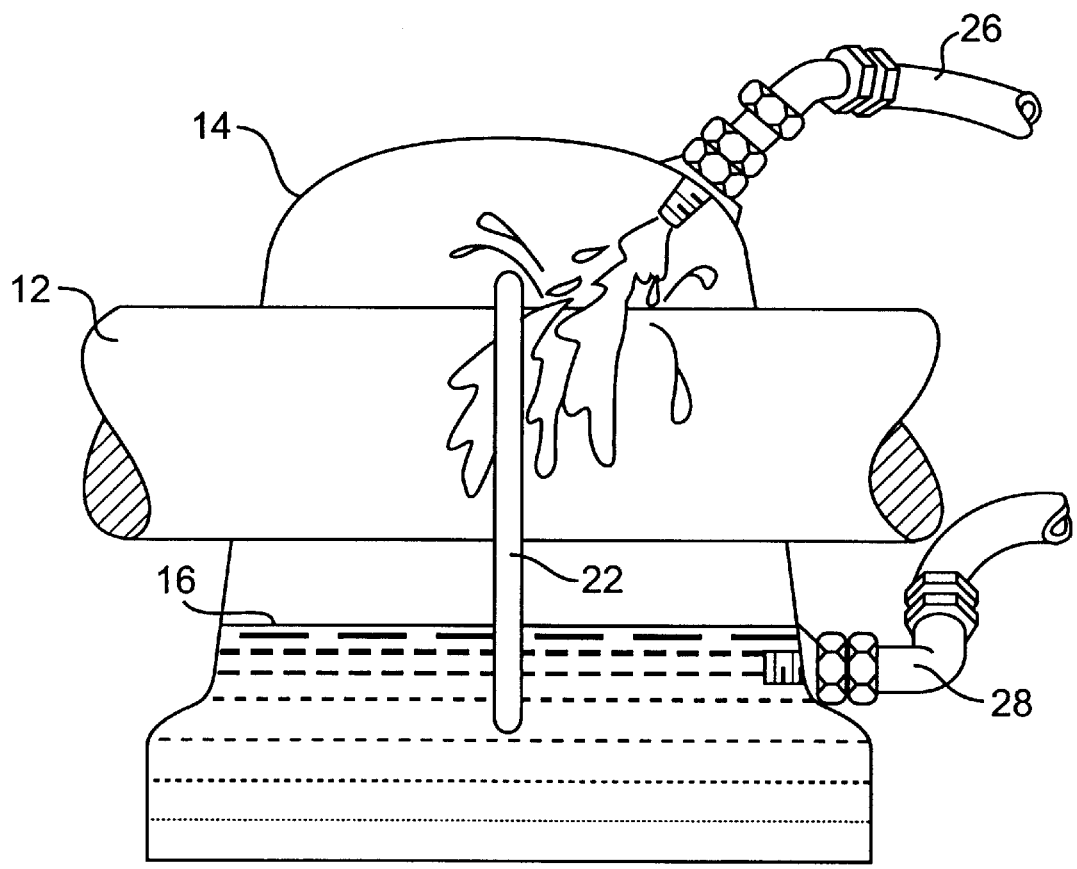
FIG. 4 is a diagrammatic representation illustrating the connection of a lubrication circulation conduit to the bearing housing of a lubrication system as seen in FIG. 1.
Figure 5:
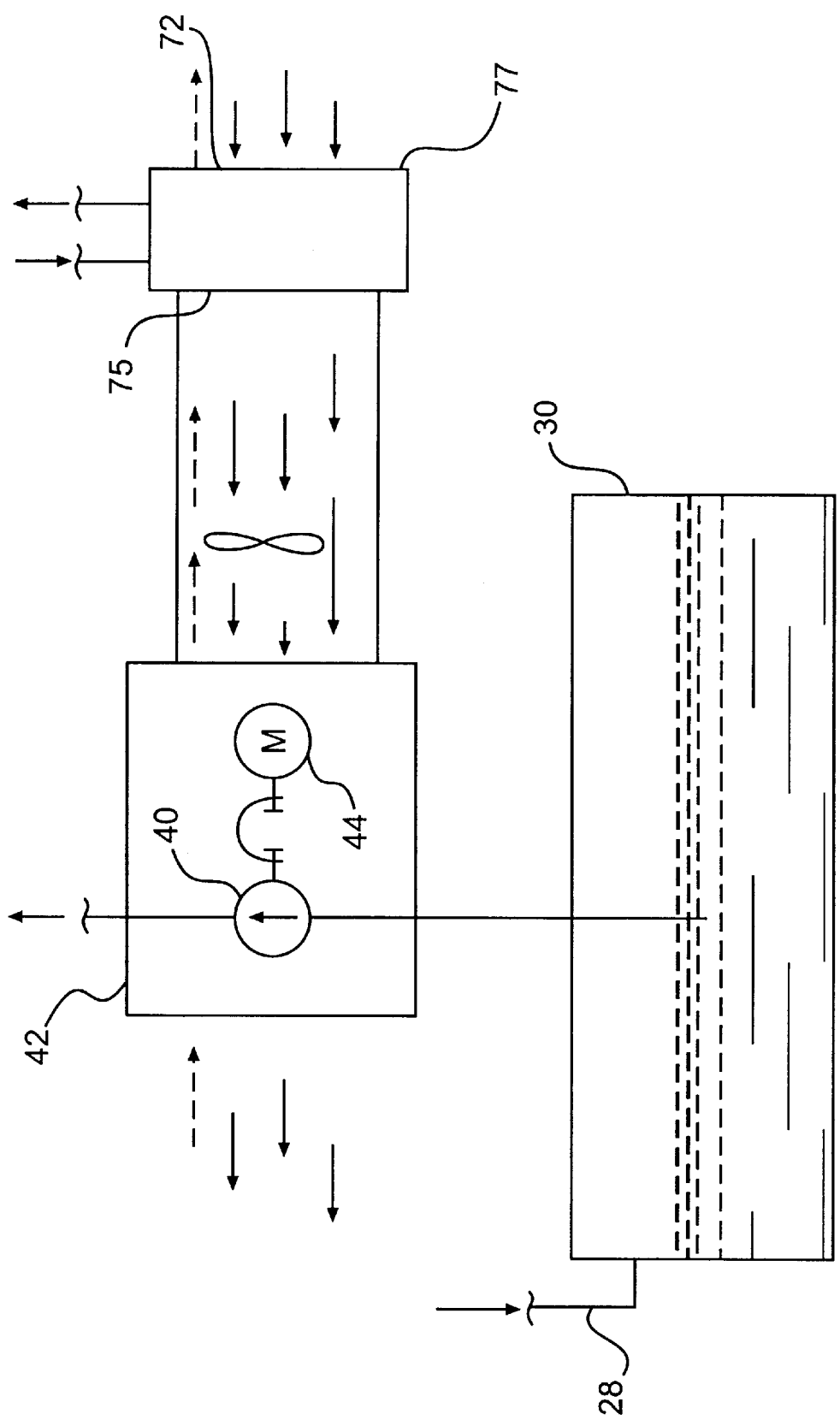
FIG. 5 is a diagrammatic representation illustrating the connection of the lubrication circulation conduits to the heat exchanger and as utilized in the lubrication system of FIG. 1.

As seen in FIG. 4, an oil ring 22 extends about shaft 12 into lubricant 16 maintained in the sump. Oil ring 22 will tend to lift oil 16 from the sump and deposit it on the top of shaft 12 as shaft 12 rotates. As a result, a supply of oil is directed from the sump to the bearing sleeve to maintain a desired oil film thereon. A lubricant circulation apparatus 24 includes fluid conduits 26 and 28 in respective fluid communication with a bearing inlet and a bearing outlet defined in housing 14 of bearing 10. The bearing inlet is preferably situated at a location readily above shaft 12 such that the lubricant field is deposited on top of shaft 12. The bearing outlet, in contrast, is preferably situated at a location below shaft 12 at approximately the desired level at which accumulated oil is to be maintained in the sump.

As best seen in reference to FIGS. 1–3 and 5, the various functional components of a lubrication circulation apparatus 24 will be described. Apparatus 24 includes a reservoir 30 for maintaining a quantity of oil 16 therein. Reservoir 30 is preferably situated at a location below bearing 10 so that oil may return by gravity from the bearing sump. As is conventional within the art, reservoir 30 may include a sight gauge 39 or other fluid level indications, such as a dip stick, to allow an indication of the fluid level therein.

A pump 40 is located within a pump housing 42. Pump 40 comprises a gear pump or other suitable pump mechanism. In one embodiment of the invention, pump mechanism 40 is driven by drive motor 44 such as a suitable electric fan-cooled motor via conventional couplings. Pump 42 defines a pump inlet connected to conduit 28 and a pump outlet connected to conduit 126. A terminal box 48 is provided to contain the electrical contacts and the like through which the electrical energy is provided to motor 44.

Apparatus 24 may further include a pressure gauge 50 of conventional design and operation which indicates the pressure in conduit 126. A filter 52 is provided to remove impurities in the oil passing through conduit 126. As seen, filter 52 may be of a cylindrical hydraulic filter having a suitable thread mount 54. However, other conventional and well known types of filters may be used based upon the requirements of any particular application.

Pump mechanism 40 draws oil from reservoir 30 at a known rate of flow. For instance, a flow rate within the range of approximately 0.5 to 1.0 gpm has been found useful, and pumps having such outputs are commercially known and available.

Figure 3:
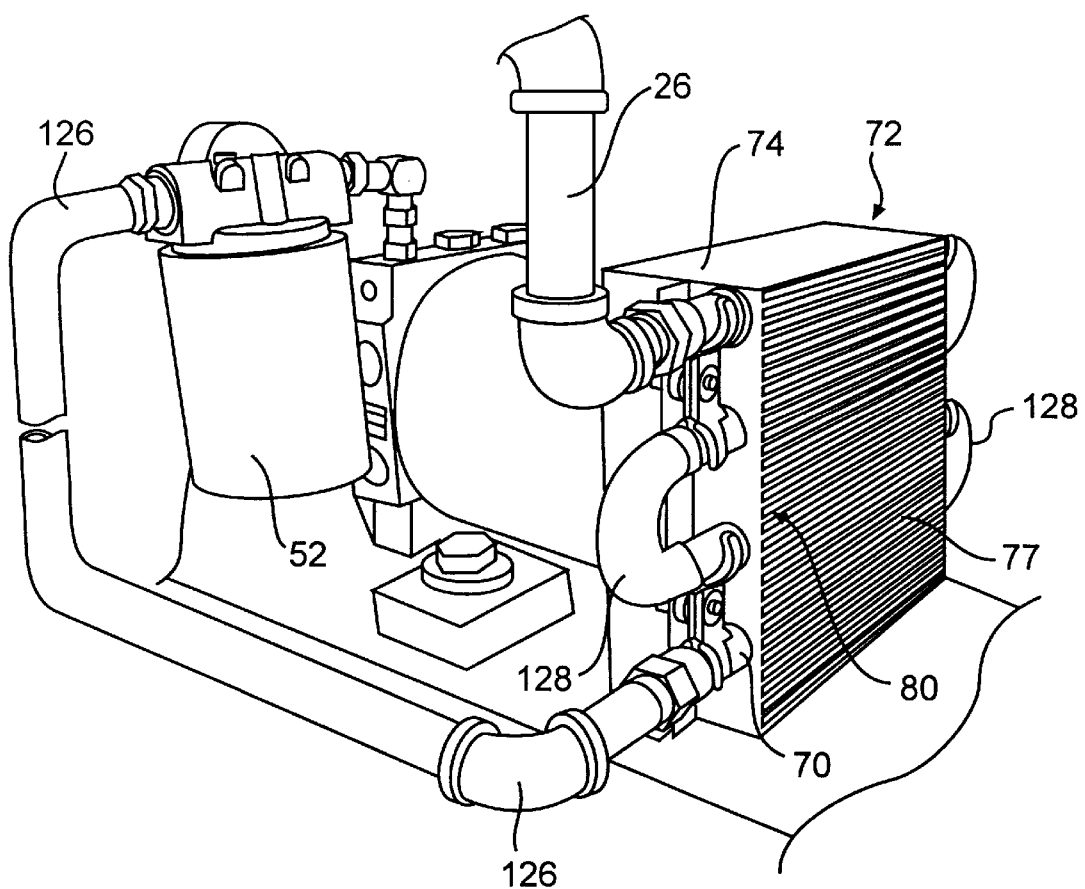
FIG. 3 is a perspective view of the air discharge surface of the lubricant fluid cooling apparatus seen in FIG. 1.

As pump 40 withdraws oil from reservoir 30, a selected quantity of the oil is passed through filter 52, and excess oil may be returned to the reservoir through a conduit (not pictured), or as described in U.S. Pat. No. 5,773,048 referenced above. Upon 15 exiting the filter, the oil is directed through conduit 126 to an intake 70 of heat exchanger 72. The heat exchanger 72 defines a housing 74. A receiving end of the housing 74 defines a substantially circular collar 76 which engages the fan cooled motor housing. As best seen in FIG. 3, conduit 126 is operatively disposed within the heat exchanger 72 and repeatedly traverses the width of exchanger 72 via a series of 180 degree bends 128 defined by portions of conduit 126. Conduit 126, preferably provided from copper tubing, is in intimate thermal contact with a plurality of cooling fins 80. Each cooling fin 80 comprises a thin sheet of metal having a thickness of about 0.025 inches. The fins 80 are preferably selected from metals, such as aluminum, having high thermal conducting properties. A gap of about 0.07 inches is defined between adjacent fins and allows for the passage of air between the fins.

The transfer of heat from the conduit 126 via fins 80 is increased by the passage of an airstream across the heat exchanger 72. Preferably, the airstream is provided by the cooling fan associated with the electric motor of pump 40. The fan generated air stream pulls air from the receiving face 77 of heat exchanger 72. The air flow, indicated by the solid arrows in FIG. 5, passes through the defined gaps between fins 80 before exiting the discharge face 75 of heat exchanger 72. The now cooled lubricant fluid exits an upper side of heat exchanger 72 along conduit 26. Conduit 26 is connected to the associated sleeve bearing as seen in FIG. 1, thereby permitting the introduction of cooled lubricant as best seen in FIG. 4.

The cooling air stream typically exhibits a 10° F. temperature increase over the temperature of the ambient air entering the heat exchanger 70. It has ben found that the airflow, though slightly heated, will cool the motor 44 without adverse effects. It is also envisioned that the direction of the airflow through the heat exchanger may be reversed as indicated by the dashed arrows in FIG. 5. For instance, where the cooling fan associated with motor 44 is used to pull air past the motor, the "exhaust" air may be further directed to pass through the heat exchanger, albeit in a reverse flow path. While the fan exhaust air stream is warmed slightly by the motor, the resulting air stream is nonetheless cooler than the temperature of the lubricant fluid circulated within the heat exchanger, and thereby serves to lower the temperature of the lubricant fluid.

For instance, a typical hydraulic sleeve bearing system as illustrated in FIG. 1 may achieve a 20–30° F. drop in lubricant fluid temperature compared to the identical system operated without the heat exchange element. It has been found that the temperature of the oil introduced into the bearing sleeve operated at about 2000 RPM may be reduced from an original temperature range of 150–180° F. to a lower temperature range of between 130–150° F. The reduction is carried out using the existing electric fan air flow to increase the efficiency of the heat exchanger. In this manner, an existing air stream is used to provide a cooling airflow across the heat exchanger. However, it is envisioned within the scope of the present invention that a different or separate airflow supply may be used.

It is appreciated by one having ordinary skill in the art that the rate of heat exchange is influenced by many factors, some of which may be varied to advantage. For instance, all else being equal, higher shaft speeds will result in a higher initial temperature of the lubricant fluid. As a result, a larger value temperature drop would result from the operation of the heat exchange system described above. Likewise, the size and thermal transfer properties of the heat exchanger may be modified so as to achieve a desired level of cooling as evaluated by the endpoint temperature of the cooled lubricant reintroduced into the bearing shaft.

It is also recognized that the reservoir walls could be constructed of selected material and shapes so as to increase the heat exchange capabilities of the lubricant fluid which resides within the reservoir. Likewise, the materials and lengths of the lubricant fluid conduits may also be varied so as to affect the heat transfer rate as may the lubricant fluid flow rate and volume which is passed through the heat exchanger. It is also appreciated that the lubricant fluid, especially a synthetic or petroleum based oil, is designed to operate at a desired temperature range and viscosity. A lubricant temperature which is too high (inefficient cooling) or too low (excessive cooling) may adversely alter the desired viscosity of the lubricant.

The illustrated embodiment makes economical use of an existing pump pressure and air flow to achieve a favorable decrease in fluid lubricant temperature. The temperature drop is obtained using an air supply which provides cooling capabilities for both the heat exchanger and the associated pump motor. Further, the temperature differential between the oil within the heat exchanger and the temperature of available air streams are such that a reverse flow direction which makes use of slightly heated fan exhaust is operative with the present apparatus and method.

The resulting temperature drop increases the operating life of the sleeve bearing. Further, the service life and quality of the oil lubricant is also increased. The present method may be adapted for the use of other types of heat exchangers. Such heat exchangers may include water cooled jackets, radiators, and/or the inclusion of oil turbulators within the heat exchange system.

Although a preferred embodiment of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A method for providing a cooled lubricant fluid to a hydrodynamic sleeve bearing having a housing defining a sump for maintaining a lubricant fluid therein and further configured to permit flow of the lubricant fluid through the housing at a predetermined flow rate, the method comprising the steps of:

removing lubricant fluid from the sump using a pump;

supplying the lubricant fluid to a heat exchanger;

directing an air stream produced by a pump motor cooling fan across a radiator surface of the heat exchanger, thereby producing a supply of a cooled lubricant fluid; and directing the cooled lubricant fluid to an upper surface of the mechanical shaft.

2. The method according to claim 1 wherein the step of supplying an air supply further comprises supplying an air supply having a temperature greater than the surrounding ambient air temperature but less than the temperature of the lubricant fluid entering the heat exchanger.

3. The method according to claim 1, including supplying the lubricant removed from the sump into a reservoir and wherein the supplying step includes supplying the lubricant from the reservoir to the heat exchanger.

4. A method according to claim 1, wherein the directing step includes producing the air stream by the pump motor cooling fan.

5. A method according to claim 1, wherein the directing step includes directing the air stream across the pump that supplies the lubricant to the heat exchanger.

6. A bearing system for facilitating rotation of a mechanical shaft, the system comprising:

a bearing device having a housing defining a bore therein for receipt of the mechanical shaft, the bearing device operative to support the mechanical shaft during rotation thereof;

the bearing housing defining a sump for maintaining an operative level of a lubricant fluid therein;

a pump in fluid communication with the sump at a pump inlet and in further communication through a pump outlet with a heat exchanger, the pump operative to draw a controlled volume of heated lubricant fluid through the pump housing and into the heat exchanger;

the heat exchanger defining a thermally conductive conduit surrounded by a plurality of spaced fins, a receiving surface of the heat exchanger configured to receive a cooling supply of air, the cooling air supply passing between the spaced fins of the heat exchanger and exiting a discharge face of the heat exchanger;

a fan configured to direct the cooling air supply across the heat exchanger and the pump; and a conduit configured to direct the cooled lubricant from the heat exchanger to the bearing housing.

7. The bearing system according to claim 6, including a reservoir between and in fluid communication with the bearing and the pump so that the reservoir receives lubricant from the sump and so that the pump pumps lubricant from the reservoir.

8. The bearing system as in claim 6, wherein the fan is disposed with respect to the heat exchanger and the pump to direct the air stream across the heat exchanger and the pump.

9. The bearing system according to claim 6 wherein the heat exchanger is contained within a housing, the housing having a collar which defines a chamber in communication with a fan, the fan establishing an airflow pathway through the heat exchanger.

10. The bearing system according to claim 9 wherein the collar defines a receiving chamber for the passage of a supply of cooling air from a cooling fan of a pump motor.

11. A bearing system for facilitating rotation of a mechanical shaft, the system comprising:

a housing defining a bore therethrough to an interior area of the housing;

a shaft rotatably disposed in the housing and extending through the bore to the interior area;

wherein the interior area defines a sump that maintains an operative level of lubricating fluid therein;

a heat exchanger;

a fluid conduit extending through the heat exchanger, the heat exchanger having an input that opens to the sump and an output that opens to the interior area to define a fluid path through the heat exchanger from the sump to the interior area;

a pump in fluid communication with the conduit and configured to move the fluid through the conduit from the sump through the heat exchanger; and a fan disposed with respect to the pump and the heat exchanger to direct an air flow to the pump and the heat exchanger.

12. The bearing system as in claim 11 wherein the heat exchanger further defines a thermally conductive conduit surrounded by a plurality of spaced fins, a receiving surface of the heat exchanger configured to receive a cooling supply of air, the cooling air supply passing between the spaced fins of the heat exchanger and exiting a discharge face of the heat exchanger.

13. The bearing system according to claim 11, including a lubricant reservoir disposed in series within the conduit between the pump and the housing, wherein a first section of the conduit extends from the sump to the reservoir and a second section of the conduit extends from the reservoir to the pump.

14. The bearing system as in claim 11, including a housing enclosing the fan and the pump and including a collar extending from the housing to the heat exchanger so that the air stream is directed through the collar.

* * * * *